United States Patent
Dhanabalan

(10) Patent No.: US 11,388,085 B2
(45) Date of Patent: *Jul. 12, 2022

(54) METHOD FOR OPTIMAL PATH SELECTION FOR DATA TRAFFIC UNDERGOING HIGH PROCESSING OR QUEUING DELAY

(71) Applicant: Citrix Systems, Inc., Fort Lauderdale, FL (US)

(72) Inventor: Praveen Raja Dhanabalan, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/990,508

(22) Filed: Aug. 11, 2020

(65) Prior Publication Data

US 2020/0374213 A1 Nov. 26, 2020

Related U.S. Application Data

(63) Continuation of application No. 16/238,865, filed on Jan. 3, 2019, now Pat. No. 10,749,787.

(51) Int. Cl.
*H04L 12/727* (2013.01)
*H04L 29/06* (2006.01)
(Continued)

(52) U.S. Cl.
CPC ............ *H04L 45/121* (2013.01); *H04L 47/32* (2013.01); *H04L 49/90* (2013.01); *H04L 63/20* (2013.01); *H04L 12/28* (2013.01)

(58) Field of Classification Search
None
See application file for complete search history.

(56) References Cited

U.S. PATENT DOCUMENTS

| | | | |
|---|---|---|---|
| 6,700,871 B1 * | 3/2004 | Harper | H04L 1/1877 709/225 |
| 8,755,266 B2 * | 6/2014 | Muley | H04L 43/50 370/217 |

(Continued)

FOREIGN PATENT DOCUMENTS

WO WO-2018/175263 A1 9/2018

OTHER PUBLICATIONS

Examination Report on AU Appl. No. 2020204648 dated Jul. 9, 2021.

(Continued)

*Primary Examiner* — Eunsook Choi
(74) *Attorney, Agent, or Firm* — Foley & Lardner LLP

(57) ABSTRACT

Described embodiments provide systems and methods for path selection proportional to a penalty delay in processing packets. A server-side intermediary may identify a delay penalty for processing packets of a server destined for a client. The server-side intermediary may be in communication via links of different latencies with a client-side intermediary. The server-side intermediary may select a second link with a latency that deviates from the lowest latency of a first link by the delay penalty. The server-side intermediary may transmit, to the client-side intermediary, duplicates of the packets via the selected second link with information indicating to hold the duplicates at the client-side intermediary. The server-side intermediary may receive an indication to drop or send the duplicates to the client. The server-side intermediary may transmit the indication to the client-side intermediary to drop or send the duplicates according to the indication.

20 Claims, 8 Drawing Sheets

(51) Int. Cl.
*H04L 45/121* (2022.01)
*H04L 47/32* (2022.01)
*H04L 49/90* (2022.01)
*H04L 9/40* (2022.01)
*H04L 12/28* (2006.01)

(56) References Cited

U.S. PATENT DOCUMENTS

| | | | | |
|---|---|---|---|---|
| 2006/0221825 | A1* | 10/2006 | Okano | H04L 47/10 370/465 |
| 2007/0008884 | A1* | 1/2007 | Tang | H04L 29/06 370/230 |
| 2007/0183323 | A1* | 8/2007 | Hannu | H04L 47/10 370/235 |
| 2008/0005346 | A1* | 1/2008 | Schoinas | H04L 47/34 709/230 |
| 2011/0158084 | A1* | 6/2011 | Lei | H04W 76/19 370/225 |
| 2013/0311848 | A1* | 11/2013 | Purohit | H04L 1/0071 714/752 |
| 2016/0164793 | A1* | 6/2016 | Basu Mallick | H04W 28/08 370/235 |
| 2016/0380860 | A1 | 12/2016 | Singhal | |
| 2017/0149529 | A1* | 5/2017 | Lorca Hernando | H03M 13/612 |
| 2017/0237639 | A1* | 8/2017 | Takemoto | H04L 69/40 398/25 |
| 2017/0324628 | A1 | 11/2017 | Dhanabalan | |

OTHER PUBLICATIONS

International Search Report and Written Opinion for PCT Appl. No. PCT/US2020/012010, dated Apr. 28, 2020.
Notice of Allowance on U.S. Appl. No. 16/238,865, dated Apr. 14, 2020.
Examination Report on CA Appl. No. 3125612 dated Aug. 13, 2021.
International Preliminary Report and Written Opinion for PCT Appl. No. PCT/US2020/012010 dated Jul. 15, 2021.

* cited by examiner

METHOD FOR OPTIMAL PATH SELECTION FOR DATA TRAFFIC UNDERGOING HIGH PROCESSING OR QUEUING DELAY

CROSS-REFERENCE TO RELATED APPLICATION

This application is a continuation of and claims priority to and the benefit of U.S. patent application Ser. No. 16/238,865, titled "METHOD FOR OPTIMAL PATH SELECTION FOR DATA TRAFFIC UNDERGOING HIGH PROCESSING OR QUEING DELAY," and filed on Jan. 3, 2019, the contents of all of which are hereby incorporated herein by reference in its entirety for all purposes.

FIELD OF THE DISCLOSURE

The present application generally relates to routing of packets. In particular, the present application relates to systems and methods for path selection proportional to a penalty delay in processing packets.

BACKGROUND

A network device may send packets to another network device via a communication path for accessing resources for an application. The packets may undergo delay in arriving at the destined network device. The delay may be due to various factors, such as processing and buffering of multiple packets at each network device along the communication path and traversal over the communication path itself.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

Network devices may exchange packets with one another using communication channels through a network. For example, intermediary devices (e.g., middle box devices) deployed between clients and servers distributed across branch offices and data centers may use site-to-site communication paths to exchange the packets through a software-defined wide-area network (SD-WAN). As these packets travel toward the destined network device from one intermediary device to another intermediary device through one of the communication paths of the network, the packets may experience delay. There may be numerous reasons for the delay in arrival of the packet, such as traversal over the network itself and additional processing and buffering at each network device. One of the major contributors to the delay from additional processing and buffering of the packets may be modules that can perform heavy packet processing, such a security appliance at a data center site. Security appliances may be placed on a server-side of the network as a separate device or in the sever-side intermediary device itself, and may monitor packets for signatures correlating with vulnerable traffic. Such appliances may queue and buffer packets for as long as 100 ms to inspect for such signatures. While inspecting packets for signs of vulnerability may provide additional security, the heavy processing performed by such appliances may incur additional delay. The delay in the delivery of packet through the communication paths of the network may lead to a whole host of deleterious effects on communication, such as latency, jitter, and packet loss, among others.

To address the technical challenges arising from delays in the sending of the packets through the network, the intermediary devices may select an optimal communication path with the best path yield and better performance for traffic based on an estimated delay. To this end, the server-side intermediary device on the same side (e.g., at the data center) as the heavy processing module (e.g., security inspection module) may detect or identify a penalty delay incurred from the heavy processing of different types of traffic. With the identification, the server-side intermediary device on the same side of the module may select the communication path through the network that is proportional to the penalty delay. As the data traffic is processed in the module (e.g., security inspector), the server-side intermediary device may duplicate and send the traffic to the other side (e.g., branch office) through the selected path. The client-side intermediary device in turn may buffer the received traffic on a queue. As the traffic is buffered, the client-side intermediary device may wait until a control signal is received via the selected communication path. The control signal may be generated and then transmitted by the server-side intermediary device to the client-side intermediary device to drop or forward the packet. In this framework, the server-side intermediary device may handle the selection of communication path depending on the cause for the penalty delay.

First, one cause of the penalty delay may be from buffering of packets prior to the heavy processing of the packets at the server-side intermediary device on the same side (e.g., the data center side) as the heavy processing module. The server-side intermediary device itself may have the heavy processing module (e.g., security appliance) incorporated as part of the functionality. In such cases, inbound latency may increase at the server-side intermediary device, and may act as a potential bottleneck in network communications and contribute to the overall delay in the delivery of the packets. For example, there may be a configured threshold in the communications of the network (e.g., 20 ms) beyond which the packets are to be duplicated and forward to the branch-side intermediary device.

Based on the delay penalty from additional buffering, the server-side intermediary device may select a communication path. In selecting the communication path, the server-side intermediary device may check all the available communication paths with the client-side intermediary device to identify a total delay in each communication path. For example, a first communication path may have a delay of 50 ms, a second communication path may have a delay of 60 ms, and a third communication path may have a delay of 70 ms. Due to the configured threshold, packets with a delay greater than the configured threshold (e.g., 20 ms) in the queue of the security appliance may be duplicated and sent to the client-side intermediary device. The exchange of packets may have a hold flag and may indicate an amount of delay (e.g., at least 20 ms).

With the determination of the delay in each communication path, the server-side intermediary device may determine a deviation in the delay in each path relative to the path with the lowest delay. Continuing from the example above, the first communication path may be the path with the lowest delay. Relative to the first communication path, the second communication path may have a deviation of 10 ms and the third communication path may have a deviation of 20 ms. The server-side intermediary device may select the communication path with the deviation from the best delay that is less than or equal to the configured threshold and that is not also the best communication path. In this example, the server-side intermediary device may select the third communication path, because the deviation of the third communication path is equal to the configured threshold of 20 ms.

Second, another cause in the penalty delay may be from signature matching delay in a dedicated appliance (e.g., a security appliance) that apply heavy processing to packets separate of the server-side intermediary device. For example, a security policy may specify that the data traffic is to be gathered and held at the security appliance for a certain number of packets (e.g., five packets) to generate a signature for the traffic. If the connection is in an early state, the congestion window size may be less than the specified number of packets (e.g., four packets). As such, two round trip times (RTTs) from the server to the security appliance may be performed to transmit the five packets, with the first RTT for the first four packets and the second RTT for the last fifth packet. Ignoring transmission delays, the net time consumed to transfer the packets from the server to the security appliance in the data center may be multiplied as a result to transmit the entire set of packets. In the current example, if the RTT between the server and security appliance is 30 ms, the total transfer time spent may be now 60 ms, as two RTTs may be spent to transfer all five packets.

Using the delay penalty due to signature matching, the server-side intermediary device may select a communication path through the network. Similar with the other case, the server-side intermediary device may check all the available communication paths with the client-side intermediary device to identify a total delay in each communication path. For example, a first communication path may have a delay of 50 ms, a second communication path may have a delay of 60 ms, and a third communication path may have a delay of 70 ms. With signature matching, packets with a delay greater than the RTT (e.g., 30 ms) in the queue of the security appliance may be duplicated and sent to the client-side intermediary device. The exchange of packets may have a hold flag and may indicate an amount of delay (e.g., at least 30 ms) to specify that the client-side intermediary device is to buffer the packet for the amount. The server-side intermediary device may select the communication path with the deviation from the best delay that has at most the RTT as the delay. In this example, the server-side intermediary device may select the third communication path, because the third communication path has a delay of 20 ms greater than the delay of the first communication path. Over the selected communication path, the server-side intermediary device may proceed to send a set of packets for a signature in sequence to the client-side intermediary device. The server-side intermediary device may also identify the communication path with the least delay to send over remaining packets for the signature received after the congestion window size. Using the previous example, the communication path with the least delay may be the first communication path.

When remaining packets after the prior set of packets for the signature arrives, the server-side appliance may send the packets with a control signal specifying whether to hold or drop the prior packets at the client-side intermediary device over the best communication path. Ignoring transmission delays, the net latency in sending the set of packets for one signature may be equal to the sum of the RTT and the total delay in the selected communication path. From the previous example, the net latency from sending the first four packets over the third communication path may be equal to 100 ms for the RTT of 30 ms and the total delay of the third communication path of 70 ms. Moreover, the net latency in sending the remaining packets received after the congestion window size may be equal to the sum of the RTT and the total delay in the best communication path. In the example, the net latency from sending the last fifth packet over the first communication path may be equal to 110 ms for the RTT of 30 ms for the first four packets, the RTT of 30 ms for the fifth packet, and the total delay of the first communication path of 50 ms. Thus, the total effective time for the entire set of packets may be equal to the maximum of the net latency in sending the set of packets for one signature and the net latency ins sending the remaining packets received after the congestion time window. Continuing with the previous example, the total effective time may be 110 ms from the net latency due to sending of the fifth packet over the first communication path.

In either scenario, once the communication path is selected, the server-side intermediary device may initiate transmission of the packets to the client-side intermediary device via the communication path to be buffered at the client-side intermediary device until further instruction. The client-side intermediary device may have a limit to the number of packets that may be buffered, and may transmit a feedback signal to the server-side intermediary device if the number is exceeded. As the heavy processing is being performed (e.g., security inspection), the server-side intermediary device may send a control signal to the client-side intermediary device to either send or drop the buffered packets. The control signal may include a range of sequence numbers with the specified instruction to send or drop the packets associated with the sequence numbers. In this manner, this configuration of the network devices may prevent the communication path with the least delay from being loaded with too many packets. Instead, the configuration may result in the utilization of the optimal communication, and may reduce or eliminate latency, jitter, and packet loss in the network.

An aspect provides a method for path selection proportional to a penalty delay in processing packets. A first device intermediary to a plurality of a clients and one or more servers may identify a delay penalty for processing one or more packets of a server of the one or more servers destined for a client of the plurality of clients. The first device may be in communication via a plurality of links of different latencies with a second device intermediary to the one or more clients and the first device. The first device may select, from the plurality of links other than a first link of the plurality of links with a lowest latency, a second link with a latency that deviates from the lowest latency of the first link by at least the delay penalty. The first device may transmit, to the second device, duplicates of the one or more packets to the second device via the selected second link with information indicating to the second device to hold the duplicates of one or more packets at the second device. The first device may receive an indication to one of drop or send the duplicates of the one or more packets to the client. The first device may transmit the indication to the second device to one of drop or send the duplicates of the one or more packets according to the indication.

In some embodiments, the second device may transmit the duplicates of the one or more packets to the client instead of the one or more packets responsive to the indication from the first device indicating to send the duplicates of the one or more packets. In some embodiments, the second device may drop the duplicates of the one or more packets so that the client does not receive either the one or more packets or the duplicates of the one or more packets.

In some embodiments, the first device may receive, from a third device the duplicates of the one or more packets. In some embodiments, the first device may generate the duplicates of the one or more packets. In some embodiments, the first device may identify the delay penalty from a third device processing the one or more packets of the server. In some embodiments, the third device may perform security inspection on the one or more packets of the server and wherein the delay penalty corresponds to a buffering delay for processing the one or more packets at the third device. In some embodiments, the first device may identify the delay penalty corresponding to one or more round trip times to send a number of the one or more packets between a third device and the server. In some embodiments, the third device may perform security inspection on the one or more packets of the server and wherein the number of packets is based at least on a number of packets for the third device to perform signature matching on the one or more packets. In some embodiments, the plurality of links may include one of a wide area network (WAN) link or a broadband link.

Another aspect provides a system for path selection proportional to a penalty delay in processing packets. The system may include a first device. The first device may be intermediary to a plurality of a clients and one or more servers. The first device may identify a delay penalty for processing one or more packets of a server of the one or more servers destined for a client of the plurality of clients. The first device may be in communication via a plurality of links of different latencies with a second device intermediary to the one or more clients and the first device. The first device may select, from the plurality of links other than a first link of the plurality of links with a lowest latency, a second link with a latency that deviates from the lowest latency of the first link by at least the delay penalty. The first device may transmit, to the second device, duplicates of the one or more packets to the second device via the selected second link with information indicating to the second device to hold the duplicates of one or more packets at the second device. The first device may receive an indication to one of drop or send the duplicates of the one or more packets to the client. The first device may transmit the indication to the second device to one of drop or send the duplicates of the one or more packets according to the indication.

In some embodiments, the second device may transmit the duplicates of the one or more packets to the client instead of the one or more packets responsive to the indication from the first device indicating to send the duplicates of the one or more packets. In some embodiments, the second device may drop the duplicates of the one or more packets so that the client does not receive either the one or more packets or the duplicates of the one or more packets.

In some embodiments, the first device may receive, from a third device, the duplicates of the one or more packets. In some embodiments, the first device may generate the duplicates of the one or more packets. In some embodiments, the first device may identify the delay penalty from a third device processing the one or more packets of the server. In some embodiments, third device may perform security inspection on the one or more packets of the server and wherein the delay penalty corresponds to a buffering delay for processing the one or more packets at the third device.

In some embodiments, the first device may identify the delay penalty corresponding to one or more round trip times to send a number of the one or more packets between a third device and the server. In some embodiments, the third device may perform security inspection on the one or more packets of the server and wherein the number of packets is based at least on a number of packets for the third device to perform signature matching on the one or more packets. In some embodiments, the plurality of links may include one of a wide area network (WAN) link or a broadband link.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
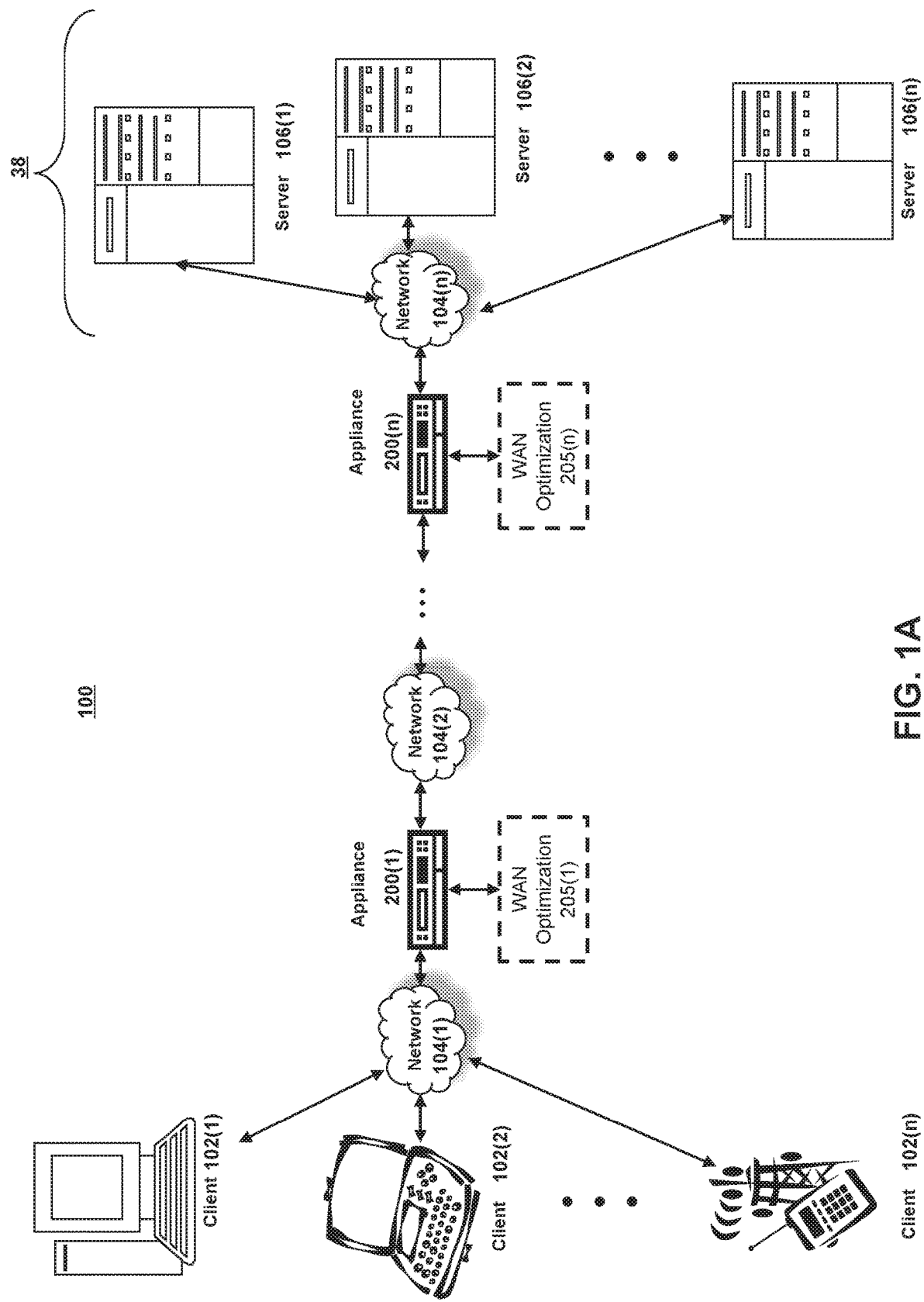
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for path selection proportional to a penalty delay in processing packets.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
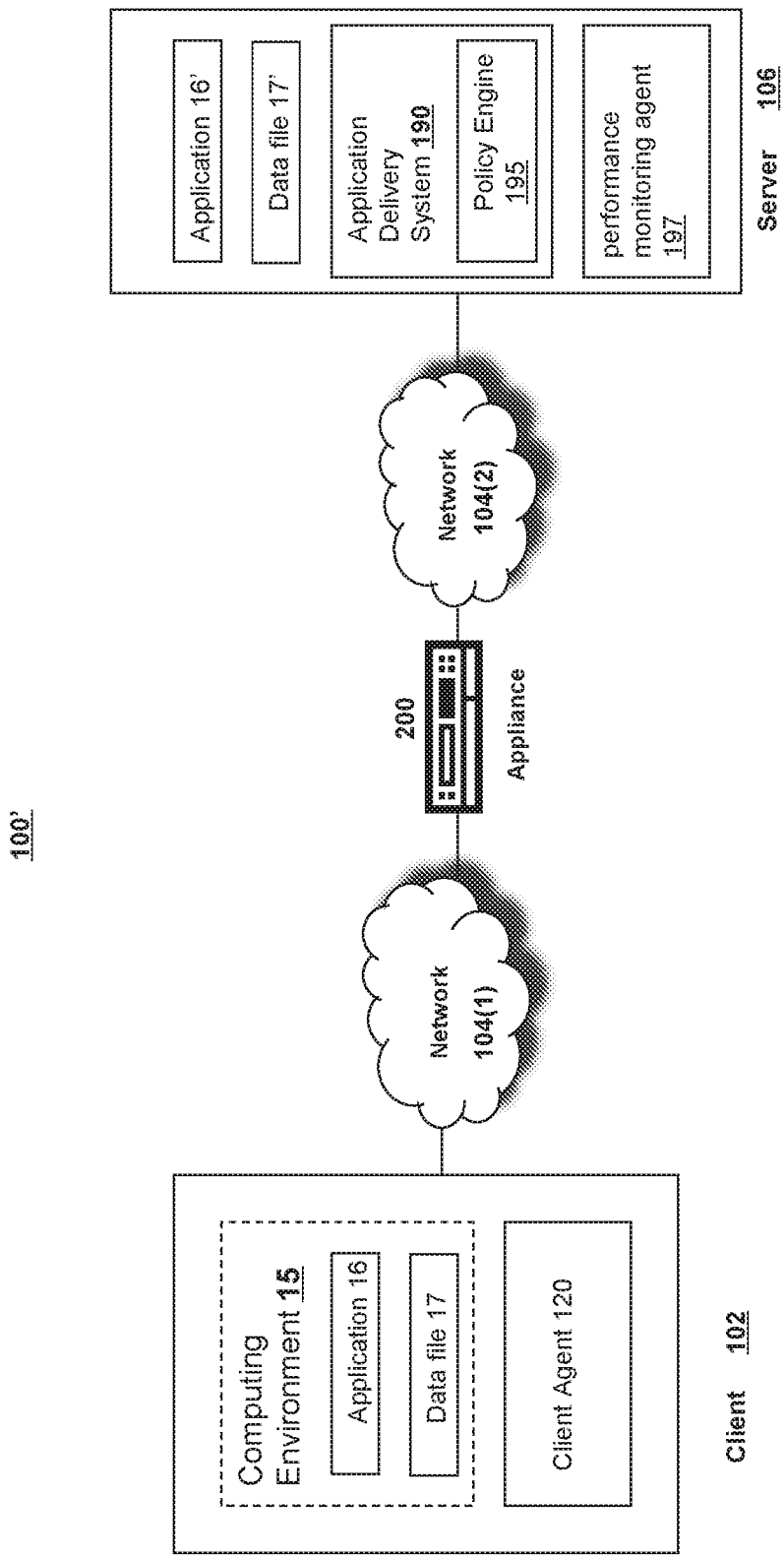
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
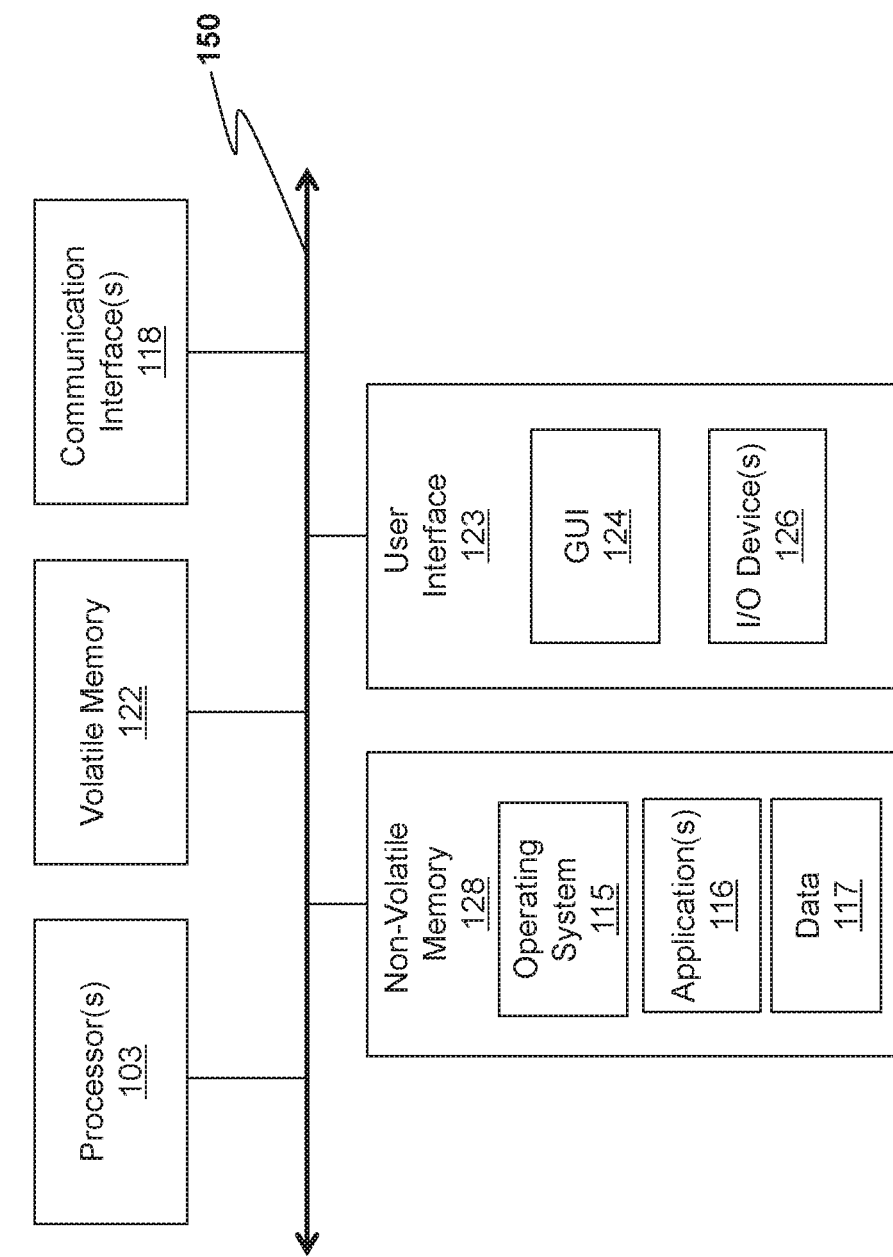
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
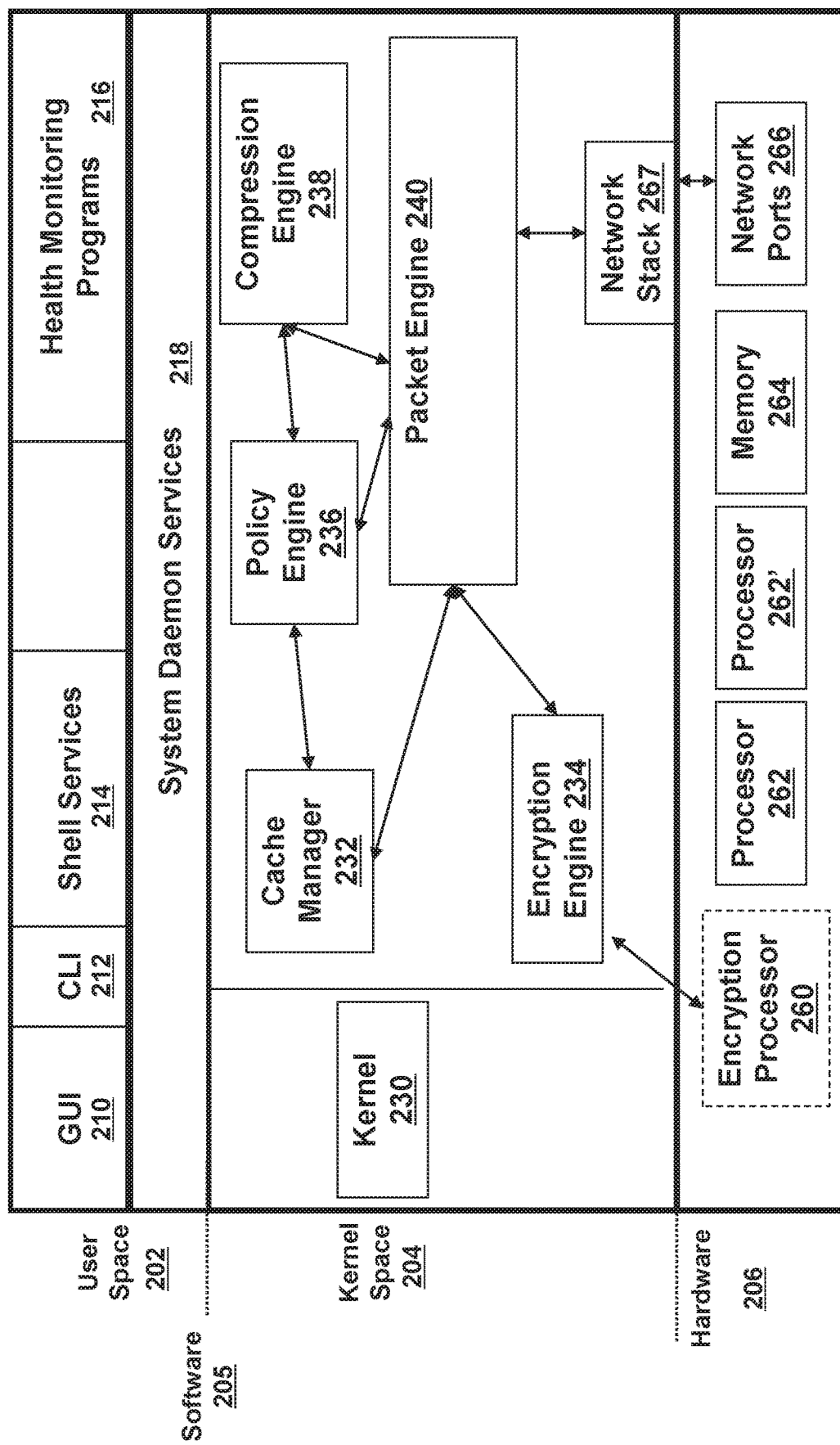
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
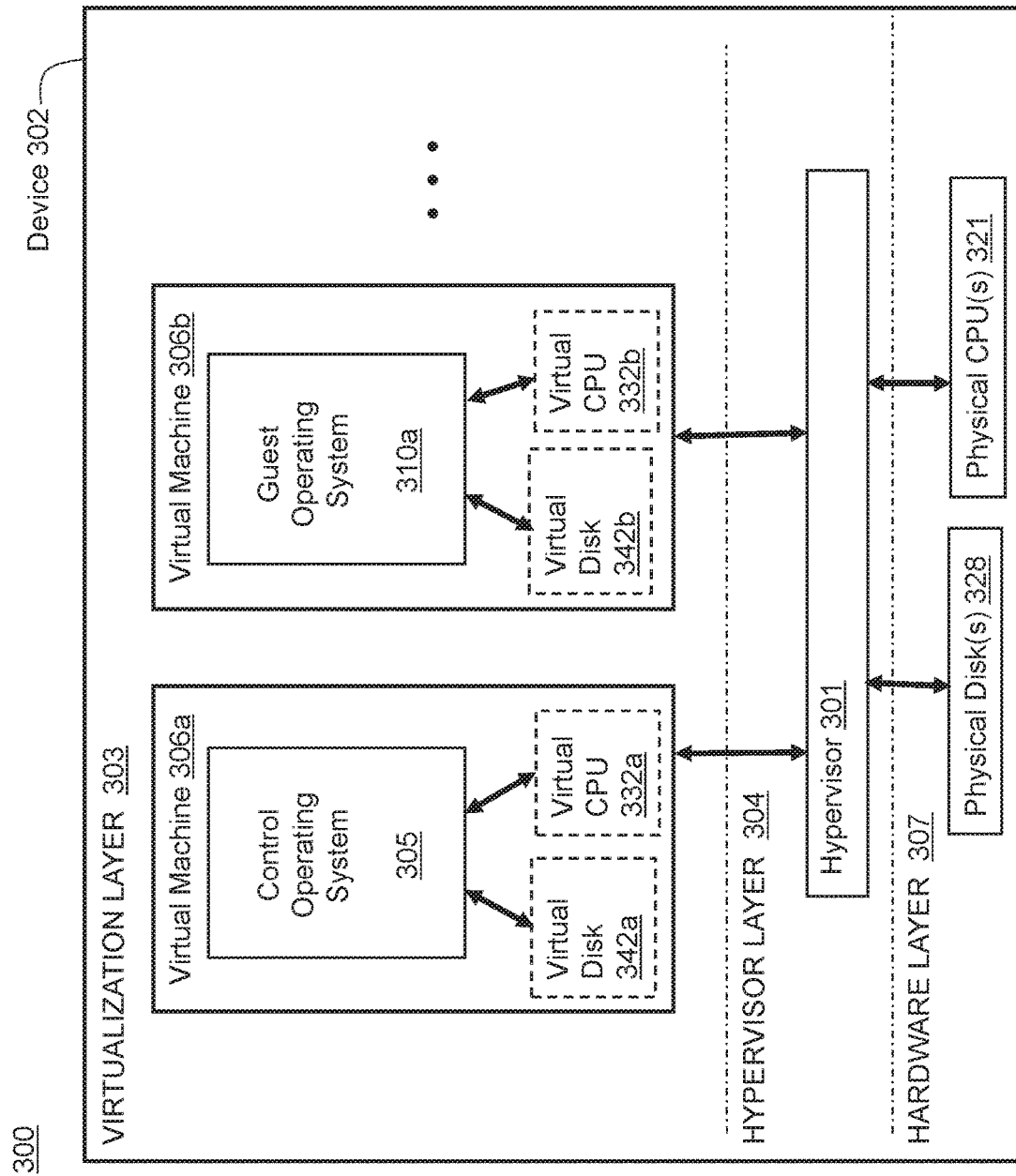
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
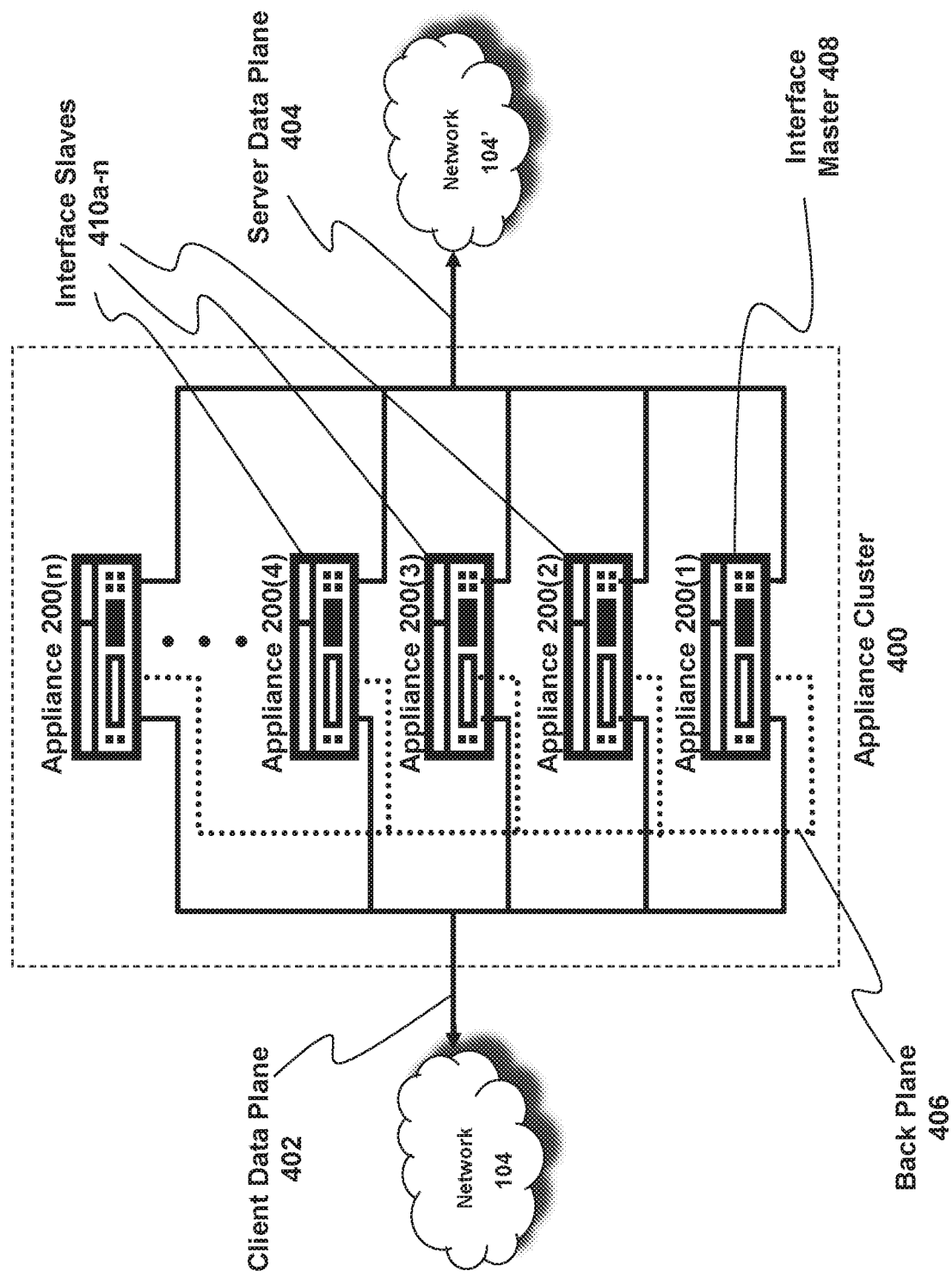
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similar to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or backplane 406. Backplane 406 may enable inter-node or inter-appliance control and configuration messages, for inter-node forwarding of traffic, and/or for communicating configuration and control traffic from an administrator or user to cluster 400. In some embodiments, backplane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

Figure 5:
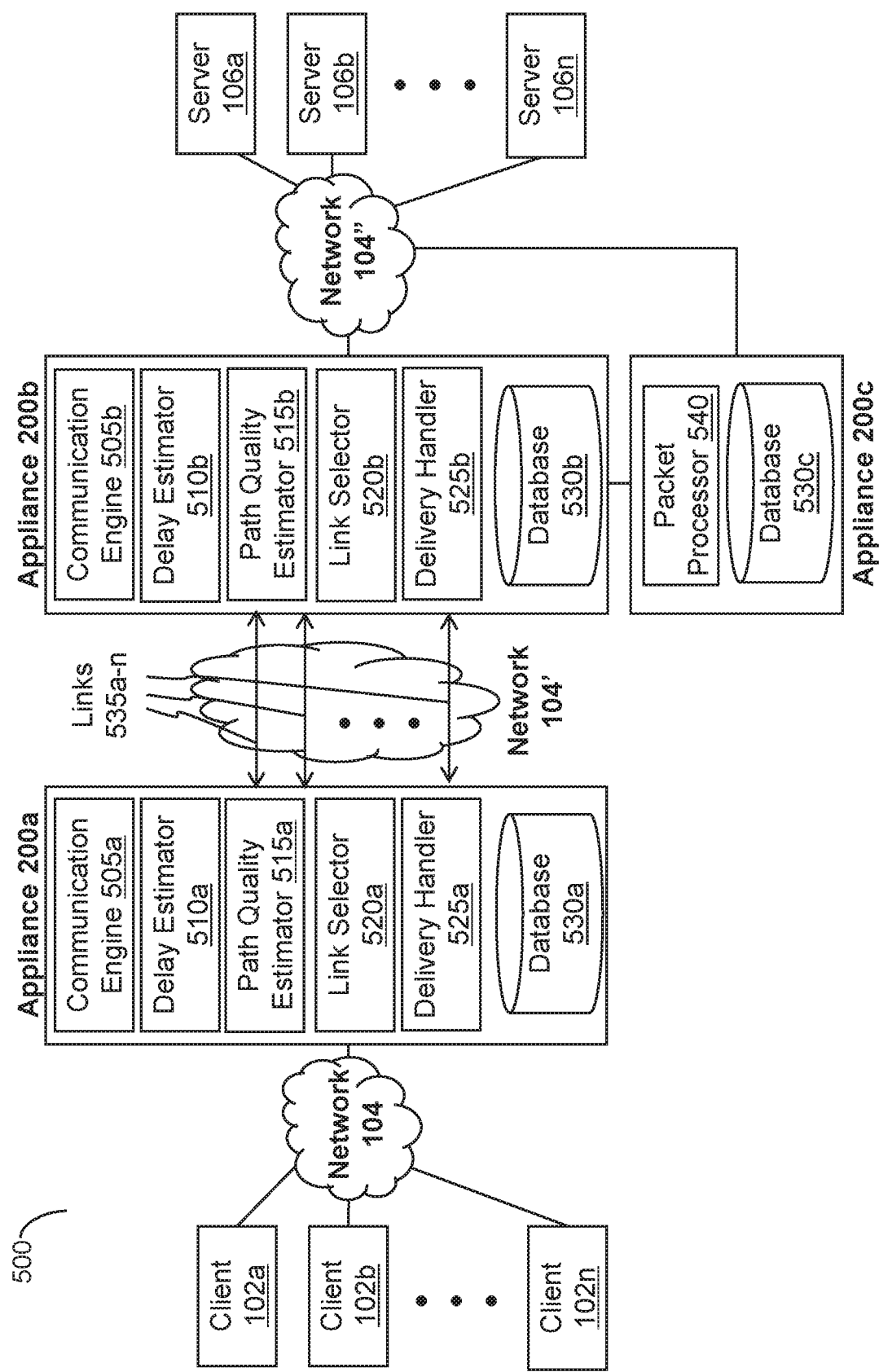
FIG. 5 is a block diagram of an embodiment of a system for path selection proportional to a penalty delay in processing packets.

E. Systems and Methods for Path Selection Proportional to a Penalty Delay in Processing Packets Referring now to FIG. 5, depicted is a system 500 for path selection proportional to a penalty delay in processing packets. In overview, the system 500 may include one or more clients 102a-n (hereinafter generally referred to as clients 102), one or more servers 106a-n (hereinafter generally referred to as servers 106), and one or more appliances 200a-n (e.g., intermediary devices, network devices, middle box devices, proxy devices). The one or more appliances 200a-n may be deployed between the clients 102 and the servers 106. The one or more appliances 200a-n may include at least one client-side appliance 200a, at least one server-side appliance 200b, and at least one dedicated appliance 200c. In some embodiments, the functionalities of the security appliances 200c may be incorporated or be part of the server-side appliance 200b.

The clients 102, the servers 106, and the appliances 200a-n may be communicatively connected to one another through one or more networks 104, 104', and 104". The one or more clients 102 and at least one a client-side appliance 200a may be in communication with one another via at least one client-side network 104. In some embodiments, the clients 102 may reside in at least one branch office and the client-side network 104 may be a private network (e.g., a local area network (LAN) or wide area network (WAN)) between the clients 102 and the client-side appliances 200a. One or more appliances 200a-n (e.g., the client-side appliance 200a, a server-side appliance 200b, and a dedicated appliance 200c) may be in communication with one another via at least one intermediary network 104'. In some embodiments, the intermediary network 104' may be a private network (e.g., a LAN, WAN, or a software-defined wide area network (SD-WAN)) among two or more of the appliances 200a-n (e.g., the client-side appliance 200a, the server-side appliance 200b, and the dedicated appliance 200c). The one or more servers 106 and at least one appliance 200a-n (e.g., the server-side appliance 200b and the dedicated appliance 200c) may be in communication with one another via at least one server-side network 104". In some embodiments, the servers 106 may reside in at least one data center, and the server-side network 104" may be a private network (e.g., a local area network (LAN) or wide area network (WAN)) or a public network (e.g., the Internet) among the server-side appliances 200b, the dedicated appliance 200c, and the servers 106.

The client-side appliance 200a may include at least one communication engine 505a, at least one delay estimator 510a, at least one path quality estimator 515a, at least one link selector 520a, at least one delivery handler 525a, at least one database 530a, among others. The server-side appliance 200b may include at least one communication engine 505b, at least one delay estimator 510b, at least one path quality estimator 515b, at least one link selector 520b, at least one delivery handler 525b, and at least one database 530b. The client-side appliance 200a and the server-side appliance 200b may be connected via one or more links 535a-n (sometimes herein referred to as communication paths) established over the network 104'. The dedicated appliance 200c (sometimes herein referred to as a security appliance) may include at least one packet processor 540 (sometimes herein referred to as a security inspector or packet inspector) and at least one database 530c. In some embodiments, the server-side appliance 500b may also include the at least one packet processor 540 of the dedicated appliance 200c. An appliance 200a-n can include or correspond to any type or form of intermediary device, network device, middle box device and/or proxy device, and so on.

The systems and methods of the present solution may be implemented in any type and form of device, including clients, servers and/or appliances 200. As referenced herein, a "server" may sometimes refer to any device in a client-server relationship, e.g., an appliance 200a in a handshake with a client device 102. The present systems and methods may be implemented in any intermediary device or gateway, such as any embodiments of the appliance or devices 200a-n described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

In further detail, the client-side appliance 200a and the server-side appliance 200b may be in communication with each other. The communication engine 505a of the client-side appliance 200a or the communication engine 505b of the server-side appliance 200b may initiate, set up, or establish a set of links 535a-n through the network 104'. The links 535a-n established over the network 104' may include one or more WAN links, one or more LAN links, or one or more broadband links, among others. In some embodiments, each communication path 530a-n may be established in accordance with any number of network protocols for point-to-point communications, such as the Generic Routing Encapsulation (GRE), virtual private network (VPN), Secure Sockets Layer virtual private network (SSLVPN), and Internet Protocol Security (IPSec), among others. The links 535a-n may have various network performances, in terms of bandwidth, latency, throughput, error rate, jitter, and number of hops between the client-side appliance 200a and the server-side appliance 200b, among other measures. In some embodiments, the links 535a-n may have different latencies. The latencies may correspond to an amount of time that one packet consumes to travel from the client-side appliance 200a to the server-side appliance 200b or from the server-side appliance 200b to the client-side appliance 200a. The network performances may affect the latencies of the links 535a-n.

With the establishment of the links 535a-n, the communication engine 505a and the communication engine 505b can exchange one or more packets between the client-side appliance 200a and the server-side appliance 200b. The communication engine 505a on the client-side appliance 200a may receive one or more packets from one of the clients 102 via the network 104. The packets from the client 102 may be destined to at least one of the servers 106. For example, the packets from the client 102 may have a destination address referencing or corresponding to one of the servers 106. Upon receipt of the packets from the client 102, the communication engine 505a may forward and send the packets via at least one of the links 535a-n to the server-side appliance 200b via the network 104'. Subsequently, the communication engine 505b of the server-side appliance 200b may receive the packets from the client-side appliance 200a via at least one of the links 535a-n via the network 104'. The communication engine 505b may then forward and send the packets to the destined one or more servers 106 via the network 104".

Conversely, the communication engine 505b on the server-side appliance 200b may receive one or more packets from one of the servers 106 via the network 104". The packets from the server 106 may be destined to at least one of the clients 102. For example, the packets from the server 106 may have a destination address referencing or corresponding to one of the clients 102. Upon receipt of the packets from the server 106, the communication engine 505b may forward and send the packets via at least one of the links 535a-n to the client-side appliance 200a via the network 104'. Subsequently, the communication engine 505a of the client-side appliance 200a may receive the packets from the server-side appliance 200b via at least one of the links 535a-n via the network 104'. The communication engine 505a may then forward and send the packets to the destined client 102 via the network 104.

Prior to the transmission of packets to the client-side appliance 200a via the network 104', the server-side appliance 200b or the dedicated appliance 200c may perform additional processing on the packets. In some embodiments, the packet processor 540 may perform additional processing on the packets, such as encryption (e.g., cryptographic hash), tokenization, and formatting, among others. In some embodiments, the packet processor 540 may perform security inspection on at least one of the packets received from the servers 106. As described above, the functionalities of the packet processor 540 may be incorporated on the server-side appliance 200b or may be performed on a separate dedicated appliance 200c. The security inspection of packets may, for example, include: security information and event management (SIEM), intrusion detection, packet inspection, intrusion prevention, data exfiltration detection, data exfiltration prevention, firewall, repeat attack prevention, and repeat attack detection, among others. The performance of the security inspection (or other processing on the packets) may be a computationally complex and consume a large amount of processor resources and memory, and may add to the delay in the packets in reaching at the client 102. In some embodiments, concurrent to performing the processing on the packets, the packet processor 540 executing on the dedicated appliance 200c may generate duplicates of the packets from the server 106. Each time a packet is duplicated, the packet processor 540 may parse the packet to identify a sequence number of the packet. The packet processor 540 may record or maintain the sequence numbers of the duplicated packets. The packet processor 540 may send the duplicates of the packets to the server-side appliance 200b.

In performing the security inspection or additional processing to the packets, the packet processor 540 may buffer or store packets received from the server 106. The packets may be maintained on a storage (e.g., on the database 530b of the server-side appliance 200b or the database 530c of the dedicated appliance 200c). In some embodiments, the packet processor 540 may maintain a counter to keep track of a number of buffered packets. The packet processor 540 may compare the number of the buffer to a threshold number. The threshold number may correspond to a minimum number of packets prior to performance of processing of the set of buffered packets. In some embodiments, the packet processor 540 may maintain a timer to keep track of a time elapsed since receipt of a first packet of the stored packets. The security engine 535 may compare the elapsed time to a threshold time limit. The threshold time limit may correspond to a maximum wait time prior to performance of processing of the set of stored packets. Once the number of packet reaches the threshold number or the elapsed time reaches the threshold time limit, the packet processor 540 may forward the packets to the clients 102 via to the network 104'. The performance of the buffering of the packets by the packet processor 540 may add to the delay in the arrival of the packet to the client 102.

In some embodiments, when the number of packet reaches the threshold number or the elapsed time reaches the threshold time limit, the packet processor 540 may also perform security inspection, such as signature matching. The packet processor 540 may generate or identify a signature using a set of packets received from the server 106. The signature (sometimes referred herein as an intrusion detection signature) may include or correspond to a pattern of data among the set of packets, such header values and payload data. The number of packets used to generate or identify the signature may range anywhere between 1 to 10,000. But the number of received packets may be less than the threshold number, as the elapsed time may reach the threshold time limit due to the congestion window size of the packets. The remaining packets may be received subsequent to the signature comparison. The packet processor 540 may compare the signature identified from the set of received packets with a set of prohibited signatures or with a set of permitted signatures. If the signature matches one of the permitted signatures or does not match any of the prohibited signatures, the packet processor 540 may allow the set of packets to be transmitted over the network 104'. Conversely, if the signature matches one of the prohibited signatures or does not match any of the permitted signatures, the packet processor 540 may perform countermeasures. The countermeasures may include restricting the transmission of packets over the network 104'. In some embodiments, when the number of packet reaches the threshold number or the elapsed time reaches the threshold time limit, the packet processor 540 may also perform other processing, such as encryption, tokenization, and formatting. The performance of the identification and the comparison of the signatures by the packet processor 540 may also add to the delay in the arrival of the packet to the client 102.

The delay estimator 510b executing on the server-side appliance 200b may identify a delay penalty for processing one or more packets from one of the servers 106. The delay penalty may be or correspond to an amount of time to be incurred in processing the one or more packets by the server-side appliance 200b or the dedicated appliance 200c. In some embodiments, the delay estimator 510b may identify the delay penalty from processing of the packets by the server-side appliance 200b or the dedicated appliance 200c, or both. In identifying the delay penalty, the delay estimator 510b may estimate, calculate, or otherwise determine the amount of time to be incurred by the one or more packets from the processing. To determine the amount of time to be incurred, the delay estimator 510b may identify one or more operations to be performed by the server-side appliance 200b or the dedicated appliance 200c. The one or more operations may, for example, include: the buffering of packets by the server-side appliance 200b or the dedicated appliance 200c or the security inspection performed by the packet processor 540 on the server-side appliance 200b or the dedicated appliance 200c. In some embodiments, the delay estimator 510b may identify the delay penalty as from buffering of the packets by the server-side appliance 200b or the dedicated appliance 200c. The buffering of packets may incur delay from the storage of the packets prior to processing and forwarding of the packets. In some embodiments, the delay estimator 510b may identify the delay penalty as from the signature matching by the server-side appliance 200b or the dedicated appliance 200c. The signature matching may incur delay from the time of travel between the server-side appliance 200b and the dedicated appliance 200c, the computations for comparing signatures from packets, and the subsequent forwarding of the packets.

With the identification of the one or more operations to be performed on the packets, the delay estimator 510b may identify or determine the amount of time incurred by the one or more packets in processing. In some embodiments, the delay estimator 510b may access a list specifying the amount of time for each operation to identify the amount of time to be incurred in performing the operations. The list may also specify the threshold time limit prior to processing for the operation. For example, the list may specify the threshold time limit for buffering by the server-side appliance 200b or the dedicated appliance 200c prior to forwarding the packets. In some embodiments, the delay estimator 510b may calculate the amount of time to be incurred based on number of other factors. The factors may include a size of the packets, a number of packets, a round-trip time (RTT), and computing resources, among others. In some embodiments, the delay estimator 510b may identify the size of the one or more packets from the server 106. In some embodiments, the delay estimator 510b may identify the number of the one or more stored packets (e.g., on the database 530b or 530c). In some embodiments, the delay estimator 510b may determine or identify the round-trip time of one or more packets between the server-side appliance 200b and the dedicated appliance 200c. The delay estimator 510b may send a test packet to the dedicated appliance 200c and wait for a response packet to measure the round-trip time between the server-side appliance 200b and the dedicated appliance 200c. In some embodiments, the delay estimator 510b may identify a consumption of computing resources on the server-side appliance 200b or the dedicated appliance 200c, such processor utilization and memory usage. Using these factors, the delay estimator 510b may determine the amount of time to be incurred. In some embodiments, the delay estimator 510b may modify adjust the amount of time identified from the list using the factors. The delay estimator 510b may use the identified amount of time to be incurred in processing the packets by the server-side appliance 200b or the dedicated appliance 200c as the delay penalty.

The path quality estimator 515b executing on the server-side appliance 200b may identify or determine a latency for each link 535a-n. The latency may correspond to an amount of time that one or more packet take to travel from the server-side appliance 200b to the client-side appliance 200a. In some embodiments, the path quality estimator 515b may estimate, calculate, or otherwise determine the latency for each link 535a-n by performing a ping test through the link 535a-n. In performing the ping test, the path quality estimator 515b may generate an echo packet for each link 535a-n. The path quality estimator 515b may send the echo packet through the link 535a-n over the network 104' to the client-side appliance 200a. The path quality estimator 515b may wait for a response packet from the client-side appliance 200a via the link 535a-n over the network 104'. The path quality estimator 515b may maintain a timer to keep track of a time elapsed from transmission of the echo packet. Upon receipt of the response packet from the client-side appliance 200a, the path quality estimator 515b may identify the elapsed time as the latency. The elapsed time may correspond to a return time trip for the link 535a-n. In some embodiments, the path quality estimator 515b may sort or rank the links 535a-n by the corresponding latencies.

Using the identified delay penalty and the latency of each link 535a-n, the link selector 520b executing on the server-side appliance 200b may select at least one of the links 535a-n. From the set of links 530a-n over the network 104', the link selector 520b may select a link 535a-n with a latency that deviates from the lowest latency by at least the delay penalty. In some embodiments, the link selector 520b may select the single existing link 535a-n. As opposed to multiple, there may be a single link 535a-n established over the network 104' between the client-side appliance 200a and the server-side appliance 200b. In selecting the link 535a-n, the link selector 520b may identify the link 535a-n with the lowest latency. For example, a first link 535a may have a latency of 50 ms, a second link 535b may have a latency of 60 ms, and a third link 535c may have a latency of 70 ms. In this example, the link selector 520b may identify the first link 535a as having the lowest latency with 50 ms. The link selector 520b may compare the latencies of the remaining links 535a-n with the lowest latency of the corresponding link 535a-n. In some embodiments, the link selector 520b may calculate or determine a deviation between the latency of each remaining link 535a-n and the lowest latency. Using the previous example, the link selector 520b may determine a deviation of 10 ms for the second link 535b (60 ms-50 ms) and a deviation of 20 ms for the third link 535c (70 ms-50 ms).

With the determination of the deviations in the latencies, the link selector 520b may identify links 535a-n with a latency deviation greater than or equal to the delay penalty. The link selector 520b may also identify links 535a-n with a latency deviation less than the delay penalty. The latency deviation may be the difference between the latency of the link 535a-n relative to the lowest latency over the links 535a-n. As explained above, the delay penalty may be or correspond to an amount of time to be incurred in processing the one or more packets by the server-side appliance 200b or the dedicated appliance 200c. The delay penalty may, for example, correspond to an amount of time incurred from the buffering of the packets or from signature matching on the packets. Continuing with the previous example, the delay penalty may be from the amount of time incurred from the buffering of the packets, and may be the threshold time limit of 20 ms. In this case, the link selector 520b may identify the second link 535b having a latency deviation less than the delay penalty (10 ms<20 ms) and identify the third link 535c having a latency deviation equal to the delay penalty (20 ms=20 ms). From the links 535a-n identified as having a latency deviation greater than or equal to the delay penalty, the link selector 520b may select the link 535a-n with the lowest latency deviation. In the previous example, the link selector 520b may select the third link 535c, as the third link 535c has the latency deviation equal to the delay penalty (20 ms) while the second link 535b has the latency deviation lower than the delay penalty.

In some embodiments, the link selector 520b may identify the link 535a-n from the links 535a-n identified as having a latency deviation closest in value to the delay penalty. The link selector 520b may determine that there are no links 535a-n with a latency deviation greater than or equal to the delay penalty. In response to the determination, the link selector 520b may compare the latency deviations of the remaining links 535a-n with the delay penalty. In some embodiments, the link selector 520b may calculate or determine a difference between the latency deviation of the link 535a-n and the delay penalty. Based on the differences between the latency deviations of the links 535a-n and the delay penalty, the link selector 520b may select one of the links 535a-n with latency deviations less than the delay penalty. With the determination of the differences, the link selector 520b may identify the link 535a-n with the lowest difference between the corresponding latency deviation and the delay penalty. Continuing with the previous example, the delay penalty may be from the amount of time incurred from the signature matching, and may be the round-trip time of 30 ms. In this example, the link selector 520b may identify the second link 535b having a latency deviation less than the delay penalty (10 ms<30 ms) and identify the third link 535c having a latency difference also less than the penalty (20 ms<30 ms). With both latency deviations less than the delay penalty, the link selector 520b may calculate the difference between the latency deviation and the delay penalty for the second link 535b as 20 ms and the third link 535c as 10 ms. Based on the differences, the link selector 520b may select the third link 535c for having the lowest difference between the latency deviation and the delay penalty. In effect, the link selector 520b may choose the non-best link 535a-n with the least difference from the delay penalty.

Using the selection of at least one of the links 535a-n, the delivery handler 525b executing on the server-side appliance 200b may transmit duplicates of the one or more packets from the server 106 to the client-side appliance 200a via the selected link 535a-n. In some embodiments, the delivery handler 525b may generate the duplicates of the packets from the server 106. In some embodiments, the delivery handler 525b may identify the packets to be duplicated. The packets may be received from one of the servers 106 via the network 104", and may be stored and maintained on server-side appliance 200b (e.g., on the database 530b) or on the dedicated appliance 200c (e.g., on the database 530c). In some embodiments, the delivery handler 525b may access the database 530b on the server-side appliance 200b to identify and retrieve the packets to be duplicated. In some embodiments, the delivery handler 525b may access the database 530c on the dedicated appliance 200c to identify and retrieve the packets to be duplicated. The packets identified from the database 530b or 530c may be the packets to be buffered, to undergo signature matching, or any other additional processing at the server-side appliance 200b or the dedicated appliance 200c. In some embodiments, the delivery handler 525b may receive the packets duplicated by the packet processor 540 from the dedicated appliance 200c. As described above, the packet processor 540 may send duplicates of the packets to the server-side appliance 200c concurrent to performing processing on the original packets received from the server 106. In some embodiments, the delivery handler 525b may intercept, receive, or otherwise identify the packets sent from the server 106 destined to one of the clients 102. In some embodiments, the delivery handler 525b may parse each packet to be duplicated to identify a sequence number. The delivery handler 525b may maintain the sequence numbers of the packets to be duplicated on the database 530b. With the identification of each packet, the delivery handler 525b may generate the duplicate of the packet to send to the client-side appliance 200a via the selected link 535a-n.

Along with the duplicated packets, the delivery handler 525b may also send information to hold the duplicates of the one or more packets at the client-side appliance 200a. The information may correspond to at least one of the duplicated packets. The information may include a command (sometimes referred herein as a flag) to hold the packet and an amount of time to hold the packet. For example, the information may be in the form "{Hold flag|Delay=30 ms}" to indicate to the client-side appliance 200a to hold the duplicated packet for 30 ms. In some embodiments, the information may an indicator signaling that the packet is a duplicated packet. In some embodiments, the delivery handler 525b may insert the information into each duplicated packet (e.g., in the header or payload data). In some embodiments, the delivery handler 525b may send the information as a separate packet to send along with the duplicates of packets via the selected link 535a-n. With the generation of the information, the delivery handler 525b may transmit the duplicated packets to the client-side appliance 200a along the selected link 535a-n. In some embodiments, the delivery handler 525b may transmit the duplicated packets to the client-side appliance 200a via the selected link 535a-n, instead of the original packets received from the server 106.

In some embodiments, the delivery handler 525b may send one or more packets identified subsequent to the processing of the packets corresponding to the duplicated packets to the client-side appliance 200a. The processing of the packets may be at the server-side appliance 200b or the dedicated appliance 200c. The one or more packets may include the packets received at the server-side appliance 200b or the dedicated appliance 200c subsequent to performance of one or more operations to a prior set of packets corresponding to the duplicated packets. For example, as explained above, the number of received packets may be less than the threshold number for carrying out signature comparison, as the elapsed time may reach the threshold time limit due to the congestion window size. Consequently, the packets may be received subsequent to the signature comparison. In some embodiments, the delivery handler 525b may identify the one or more packets received subsequent to the processing by accessing the database 530b of the server-side appliance 200b or the database 530c of the dedicated appliance 200c. The delivery handler 525b may send or forward the one or more packets received subsequent to the processing via the link 535a-n identified as having the lowest latency. In some embodiments, the delivery handler 525b may send the one or more packets received subsequent to the processing without duplication of the packets.

From the server-side appliance 200b, the delivery handler 525a executing on the client-side appliance 200a may receive the duplicated one or more packets with the information. The delivery handler 525a may store or maintain the duplicated packets received from the server-side appliance 200b on the database 530a. In some embodiments, the delivery handler 525a may store the duplicated packets onto a buffer maintained on the database 530a. The delivery handler 525a may parse the information received with the duplicated packets to identify the command to hold and the amount of time to hold at the client-side appliance 200a. In some embodiments, upon receipt of the duplicated packet, the delivery handler 525a may maintain a timer to keep track of a time elapsed since the receipt of the duplicated packet from the server-side appliance 200b. The delivery handler 525a may compare the elapsed time to the amount of time to hold as specified in the information sent with the duplicated packet. When the elapsed time is less than the amount of time, the delivery handler 525a may continue to hold or maintain the duplicated packet on the database 530a. On the other hand, when the elapsed time is greater than or equal to the amount of time, the delivery handler 525a may delete or no longer maintain the duplicated packet from the database 530a.

In some embodiments, as more and more duplicated packets are received from the server-side appliance 200b, the delivery handler 525a may send a feedback signal to the server-side appliance 200b to cease transmission of the duplicated packets. The delivery handler 525a may maintain a counter to keep track of a number of the duplicated packets maintained on the database 530a. Each time the counter is incremented, the delivery handler 525a may compare the number of duplicated packets to a threshold number. The threshold number may correspond to a maximum number of packets permitted to be maintained on the client-side appliance 200a by the size capacity of database 530a. When the number of duplicated packets is less than or equal to the threshold number, the delivery handler 525a may allow storage of the duplicated packet on the database 535a. In contrast, when the number of duplicated packets is greater than the threshold number, the delivery handler 525a may send the feedback signal to the server-side appliance 200b via the network 104' to cease transmission of the duplicated packets. The feedback signal may include a termination command (or flag) to indicate to the server-side appliance 200b to stop transmission of the duplicated packets. Upon receipt of the feedback signal, the delivery handler 525b on the server-side appliance 200b may terminate transmission of the duplicated packets to the client-side appliance 200a.

Concurrent with or subsequent to the transmission of the duplicated packets, the delivery handler 525b may identify or receive an indication to drop or send the duplicates of the packets at the client-side appliance 200a. The indication may be any sign that the duplicates of the packets maintained on the database 530a of the client-side appliance 200a is to be dropped or sent to the client 102. In some embodiments, the indication may be at least one control signal. The control signal may include a command (or flag) to drop the duplicated packets or a command (or flag) to send the duplicated packets to the client 102. In some embodiments, the control signal may include a set of sequence numbers for packets to be dropped or sent. In some embodiments, the delivery handler 525b may identify the sequence numbers of the duplicated packets sent to the client-side appliance 200a over the selected link 535a-n. The delivery handler 525b may insert or include the sequence numbers of duplicated packets into the control signal. In some embodiments, a subset of the duplicated packets may be indicated as to be dropped, while another subset of the duplicated packets may be indicated as to be sent. Each subset may be indexed or identified using the sequence numbers. With the receipt of the indication, the delivery handler 525b may in turn transmit the indication to the client-side appliance 200a over the network 104'. The indication may be sent over the selected link 535a-n or the link 535a-n with the lowest latency to the client-side appliance 200a.

In some embodiments, the delivery handler 525b may receive the indication (e.g., the control signal) from the packet processor 540 executing on the server-side appliance 200b or the dedicated appliance 200c. Upon completion of the performance of the operation on the one or more packets corresponding to the duplicated, the packet processor 540 may generate the indication based on the results of the operation. As explained above, the operation may include the buffering of the packets, signature matching on the packets, or, other processing, among others. For example, when the processing of the packets is successful (e.g., successful signature matching), the packet processor 540 may generate the indication to send the duplicated packets to the client 102. In some embodiments, the packet processor 540 may identify the sequence number of the corresponding duplicated packets corresponding to packets in which the processing (e.g., security inspection) is successful. On the other hand, when the processing of the packets is not successful (e.g., failure in signature matching), the packet processor 540 may generate the indication to drop the duplicated packets maintained on the database 530a. In some embodiments, the packet processor 540 may identify the sequence number of the corresponding duplicated packets corresponding to packets in which the processing is not successful. As discussed above, the packet processor 540 may maintain the sequence number of previously duplicated packets. With the generation of the indication, the packet processor 540 may send or relay the indication to the delivery handler 525b. The delivery handler 525b in turn may transmit the indication to the client-side appliance 200a via the network 104'.

From the server-side appliance 200b via the network 104', the delivery handler 525a executing on the client-side appliance 200a may receive the indication. In accordance with the indication received from the server-side appliance 200b, the delivery handler 525a may send or drop the duplicated packets maintained on the database 530a of the client-side appliance 200a. When the indication is to send the duplicate packets, the delivery handler 525a may forward, send, or transmit the duplicate packets to the client 102 via the network 104. In some embodiments, the delivery handler 525a may send the duplicated packets maintained on the database 530a to the client 102, instead of the original packets from the server 106. Conversely, when the indication is to drop the duplicate packets, the delivery handler 525a may drop, remove, or otherwise prevent transmission of the duplicate packets to the client 102. In some embodiments, the delivery handler 525a may prevent transmission of the duplicated packets and the original packets to the client 102.

The delivery handler 525a may determine or identify whether to drop or to send the duplicated packets on an individual basis. For each duplicated packet maintained on the database 530a, the delivery handler 525a may parse the indication to identify whether to send or drop the packet. In some embodiments, the delivery handler 525a may parse the sequence numbers from the indication to identify which duplicated packets to drop and which duplicated packets to send to the client 102. In some embodiments, the delivery handler 525a may identify the command for the duplicated packet corresponding to the sequence number of the indication. If the indication is to send the duplicate packet, the delivery handler 525a may forward, send, or transmit the duplicate packet to the client 102 via the network 104. In some embodiments, the delivery handler 525a may transmit the duplicate packet to the client 102, instead of the original packet from the server 106. The delivery handler 525a may compare the sequence number of each additional received packet to the sequence number of the duplicated packet indicated as to be sent. The additional received packet may be received by the client-side appliance 200a separately from duplicate packets. If the sequence numbers match, the delivery handler 525a may send the duplicate packet, instead of the original packet. Conversely, if the indication is to drop the duplicate packet, the delivery handler 525a may drop or remove the duplicate packet from the database 350a. In some embodiments, the delivery handler 525a may prevent transmission of the duplicated packet to the client 102 via the network 104. The delivery handler 525a may also prevent transmission of the original packet from the server 106 to the client 102. The delivery handler 525a may compare the sequence number of each additional received packet to the sequence number of the duplicated packet indicated as to be sent. The additional received packet may be received by the client-side appliance 200a separately from duplicate packets. If the sequence numbers match, the delivery handler 525a may restrict or prevent forwarding of the additional packet to the client 102.

Because the duplicated packets are already stored on client-side appliance 200a and may be dropped or sent to the client 102 when the processing (e.g., security inspection) is completed, the additional processing of the packet may not incur additional delay in receipt of the packet. Furthermore, since a link 535a-n besides the one with the lowest latency is selected to transmit the duplicated packets to the client-side appliance 200a, over-utilization of the link 535a-n with the lowest latency may be prevented. In this manner, latency, jitter, and packet loss over the network 104' may be reduced and consequently the quality of service over the network 104' may be improved.

In some embodiments, the functionalities and operations performed by the client-side appliance 200a and the server-side appliance 200b may be switched or transposed. For example, the dedicated appliance 200c may reside on the client-side, and in communication with the clients 102 and the client-side appliance 200a. The delay estimator 510a of the client-side appliance 200a may perform the same functionalities as the delay estimator 510b of the server-side appliance 200b as detailed above in identifying the delay penalty incurred from processing of the packets by the client-side appliance 200a or the dedicated appliance 200c. The path quality estimator 510a of the client-side appliance 200a may perform the same functionalities as the path quality estimator 510b of the server-side appliance 200b in determining the latencies of the links 535a-n. The link selector 520a of the client-side appliance 200a may perform the same functionalities as the link selector 520b of the server-side appliance 200b as detailed above in selecting the links 535a-n. The delivery handler 525a of the client-side appliance 200a may perform the same functionalities as the delivery handler 525b of the server-side appliance 200b as detailed above in managing packets.

Figure 6:
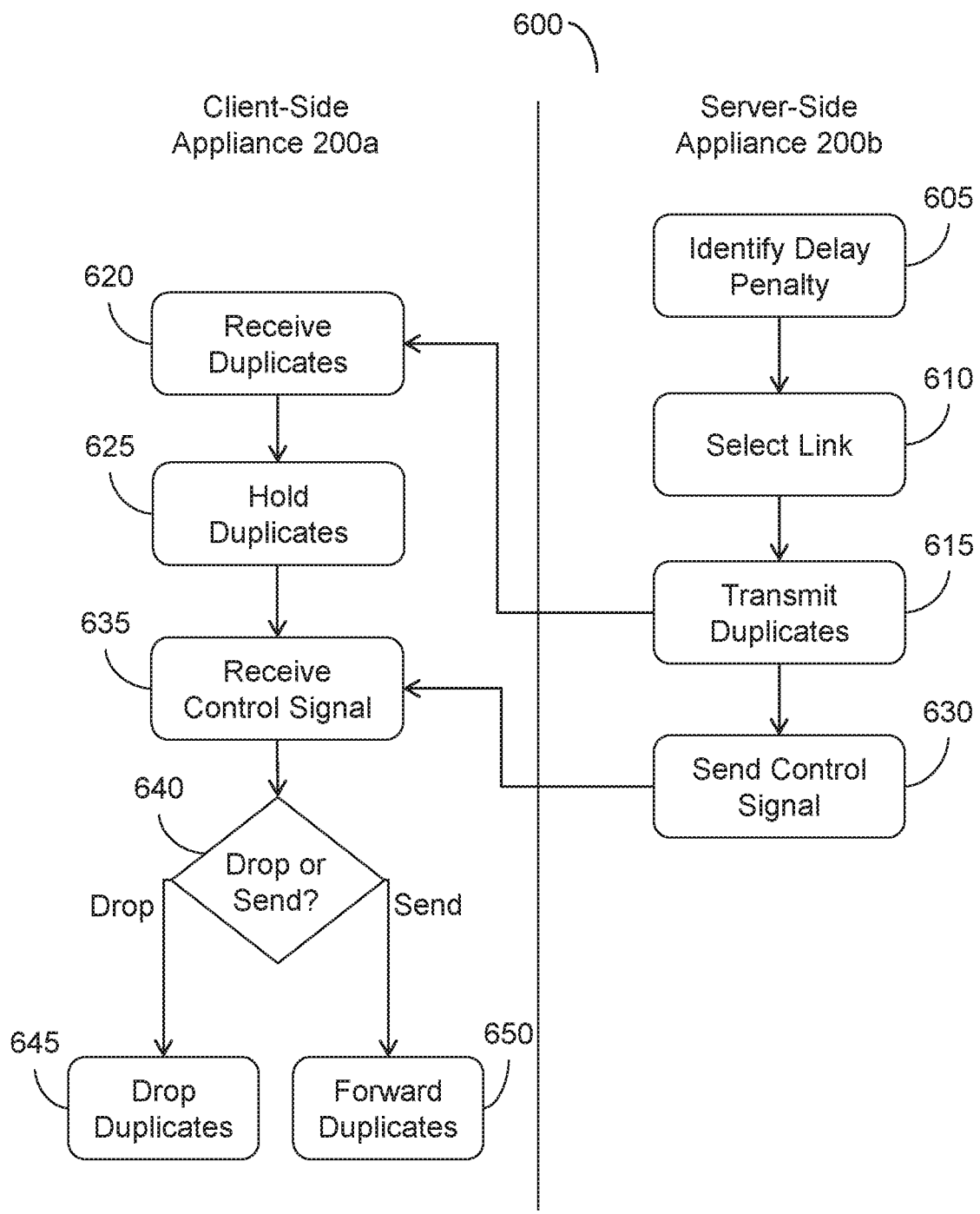
FIG. 6 is a flow diagram of an embodiment of a method for path selection proportional to a penalty delay in processing packets.

Referring now to FIG. 6, depicted is a flow diagram for a method 600 of path selection proportional to a penalty delay in processing packets. The functionalities of method 600 may be implemented using, or performed by, the components described in FIGS. 1-5, such as the clients 102, the servers 106, or appliance 200a-n. In brief overview, a server-side appliance may identify a delay penalty (605). The server-side appliance may select a link (610). The server-side appliance may transmit duplicates (615). A client-side appliance may receive the duplicates (620). The client-side appliance may hold the duplicates (625). The server-side appliance may send a control signal (630). The client-side appliance may receive the control signal (635). The client-side appliance may determine whether to drop or send (640). If drop, the client-side appliance may drop the duplicates (645). On the other hand, if send, the client-side appliance may forward the duplicates (650).

In further detail, a server-side appliance (e.g., the server-side appliance 200b) may identify a delay penalty (605). The delay penalty may correspond to an amount of time to be incurred in processing the packets by the server-side appliance or a dedicated appliance (e.g., the dedicated appliance 200c). The processing of the packets may include operations, such as buffering, signature matching for security inspection, or other types of heavy processing (e.g., encryption). To determine the delay penalty, the server-side appliance may identify an operation to be performed on the packets. The server-side appliance may identify a threshold time as the delay penalty for buffering. The server-side appliance may identify a round-trip time between the server-side appliance and the dedicated appliance as the delay penalty for signature matching.

The server-side appliance may select a link (e.g., the link 535a-n) (610). The server-side appliance may also identify a latency for each link over a network (e.g., the network 104') between a client-side appliance (e.g., the client-side appliance 200a) and the server-side appliance. The latency may be due to network conditions over the link. The server-side appliance may identify the link with the lowest latency, and may exclude the link with the lowest latency from selection. From each of the remaining links, the server-side appliance may determine a deviation from the lowest latency. The server-side appliance may then identify the link with the deviation greater than or equal to the delay penalty.

The server-side appliance may transmit duplicates (615). The server-side appliance may generate and send duplicates of packets over the selected link. The server-side appliance may identify the packets to be duplicated by accessing a database on the server-side appliance or the dedicated appliance (e.g., the database 530b or 530b). The packets to be duplicated may have originally been from a server (e.g., the server 106). A client-side appliance (e.g., the client-side appliance 200a) may receive the duplicates (620). The client-side appliance may receive the duplicate of packets from the server-side appliance. The client-side appliance may hold the duplicates (625). The client-side appliance may maintain the duplicate packets on a database (e.g., the database 530a).

The server-side appliance may send a control signal (630). The server-side appliance may receive the control signal from the dedicated appliance, upon completion of the buffering, security inspection, or other processing on the original packets corresponding to the duplicate packets. The control signal may include a command indicating that the client-side appliance is to drop or send the duplicate packets based on the results of the processing of the packets. The client-side appliance may receive the control signal (635). The client-side appliance may parse the control signal to identify the command. The client-side appliance may determine whether to drop or send the packets to the client (640). The client-side appliance may drop or send the duplicate packets maintained on the database in accordance to the command of the control signal. If the packets are to be dropped, the client-side appliance may drop the duplicates (645). The client-side appliance may restrict transmission of the duplicate packets and the corresponding original packets from the server to a client (e.g., the client 102). On the other hand, if the packets are to be sent, the client-side appliance may forward the duplicates (650). The client-side appliance may send the duplicate packets maintained on the database to the client, instead of the original packets form the server.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

I claim:

1. A method comprising:
   communicating, by a first device to a second device, one or more packets over a link selected from a plurality of links based at least on latency;
   communicating, by the first device to the second device, duplicates of the one or more packets;
   receiving, by the first device, an indication to one of drop or send the duplicates of the one or more packets; and
   transmitting, by the first device, the indication to the second device to cause the second device to one of drop or send the duplicates of the one or more packets according to the indication.

2. The method of claim 1, further comprising identifying, by the first device, a delay penalty for processing one or more packets communicated between the first device and the second device.

3. The method of claim 2, further comprising selecting the link from the plurality of links based on a latency of the link deviating from the latency of at least one other link of the plurality of links by at least the delay penalty.

4. The method of claim 2, further comprising determining the delay penalty based at least on a number of round trip times to send a number of packets via the link.

5. The method of claim 1, further comprising transmitting, by the first device to the second device, the duplicates of the one or more packets via the link with information indicating to the second device to hold the duplicates of the one or more packets at the second device.

6. The method of claim 1, wherein the first device and second device are intermediary to a plurality of clients and a plurality of servers.

7. The method of claim 6, further comprising communicating between the first device and the second device packets between the plurality of clients and the plurality of servers using the plurality of links, each of the plurality of links having different latencies.

8. A system comprising:
   a first device in a communication with a second device via a plurality of links;
   wherein the first device is configured to:
      communicate, to the second device, one or more packets over a link selected from the plurality of links based at least on latency;
      communicate, to the second device, duplicates of the one or more packets;
      receive an indication to send the duplicates of the one or more packets; and
      transmit the indication to the second device to cause the second device to send the duplicates of the one or more packets.

9. The system of claim 8, wherein the first device is further configured to determine a delay penalty for processing one or more packets communicated between the first device and the second device via the link.

10. The system of claim 9, wherein the first device is further configured to select the link from the plurality of links based on a latency of the link deviating from the latency of at least one other link of the plurality of links by at least the delay penalty.

11. The system of claim 9, wherein the first device is further configured to determine the delay penalty based at least on a number of round trip times to send a number of packets via the link.

12. The system of claim 8, wherein the first device is further configured to transmit to the second device duplicates of the one or more packets with information indicating to the second device to hold the duplicates of the one or more packets at the second device.

13. The system of claim 8, wherein the first device and second device are intermediary to a plurality of clients and a plurality of servers and are configured to communicate packets between the plurality of clients and the plurality of servers using the plurality of links, each of the plurality of links having different latencies.

14. A system comprising:
a first device in a communication with a second device via a plurality of links;
wherein the first device is configured to:
communicate, to the second device, one or more packets over a link selected from the plurality of links;
communicate, to the second device, duplicates of the one or more packets;
receive an indication to drop the duplicates of the one or more packets; and
transmit the indication to the second device to cause the second device to drop the duplicates of the one or more packets.

15. The system of claim 14, wherein the first device is further configured to determine a delay penalty for processing one or more packets communicated between the first device and the second device via the link.

16. The system of claim 15, wherein the first device is further configured to select the link from the plurality of links based on a latency of the link deviating from the latency of at least one other link of the plurality of links by at least the delay penalty.

17. The system of claim 15, wherein the first device is further configured to determine the delay penalty based at least on a number of round trip times to send a number of packets via the link.

18. The system of claim 14, wherein the first device is further configured to transmit to the second device duplicates of the one or more packets with information indicating to the second device to hold the duplicates of the one or more packets at the second device.

19. The system of claim 14, wherein the first device and second device are intermediary to a plurality of clients and a plurality of servers.

20. The system of claim 14, wherein the first device and second device are configured to communicate packets between the plurality of clients and the plurality of servers using the plurality of links, each of the plurality of links having different latencies.

* * * * *